CHASSIS CONSTRUCTION

Filed Nov. 17, 1960 2 Sheets-Sheet 1

INVENTOR.
ELLIS L. RONEY
BY John F. Fauk
ATTORNEY

CHASSIS CONSTRUCTION

Filed Nov. 17, 1960 2 Sheets-Sheet 2

INVENTOR.
ELLIS L. RONEY

BY John F. Fowler
ATTORNEY

United States Patent Office 3,072,874
Patented Jan. 8, 1963

3,072,874

CHASSIS CONSTRUCTION

Ellis L. Roney, Los Altos, Calif., assignor to Sylvania Electric Products Inc., a corporation of Delaware Filed Nov. 17, 1960, Ser. No. 69,914
2 Claims. (Cl. 339—17)

This invention relates to a chassis construction for electronic apparatus.

Many chassis mounted electronic parts have several terminals each to which electrical connections are made under the chassis. For example, a tube socket may have as many as five to eight terminal elements projecting in a cluster from its base. Conventional practice is to make individual circuit connections to each terminal element of each socket by separate conductors with a result that there is a maze of such conductors interconnecting the several stages of a multi-tube equipment. Other disadvantages of this practice are the large amount of time and hand labor required in making the connections since these techniques have been adapted to machine-type assembly.

In accordance with my invention, a plurality of sheet-like conductors separated by insulator sheets are stacked and secured to the underside of the chassis plate in a manner of a multi-layer sandwich. The stack has an opening for each tube socket, and each opening is formed to register with the sockets so that the socket terminals extend into the opening. The sheet conductors are conneced to external circuits, such as power supply circuits, at one end of the chassis and function as planar bus bars for providing common electrical connections for the tube sockets. The terminals on the tube sockets are connected directly to appropriate lugs on the sheets at the stack openings. The only connecting wires needed are those used for signal-frequency transmission, i.e., the radio frequency interconnections between stages of a multi-stage amplifier.

In addition to providing electrical connections between external circuits and components on the chassis the conductor and insulator stack functions as a combination by-pass condensor and choke so as to eliminate the need for these additional circuit components. Because of the distributed nature of the sheet conductors, frequency "dead spots" characterized by the self-resonant nature of conventional chokes and by-pass condensers are eliminated. Also, the distributed capacitance inherent in this construction results in a broader admittance-frequency response than is possible with conventional by-pass condensers.

An object of my invention is the provision of a chassis construction with a self-contained energy distribution system for energizing components mounted on the chassis.

Another object is a provision of a multi-conductor energy distribution system for chassis mounted components, which system may be readily mass produced at low cost.

Another object is a provision of a chassis construction with a prefabricated multi-conductor stack having built-in by-pass capacitance and choke inductance.

A more specific object is the provision of a compact low-cost combination chassis and prefabricated electrical transmission line.

Still another object is the provision of a prefabricated chassis construction with built-in by-pass capacitance with an improved admittance-frequency response characteristic.

These and other objects of my invention will become apparent from the following description of the preferred embodiment thereof, reference being had to the accompanying drawings in which.

Figure 1:
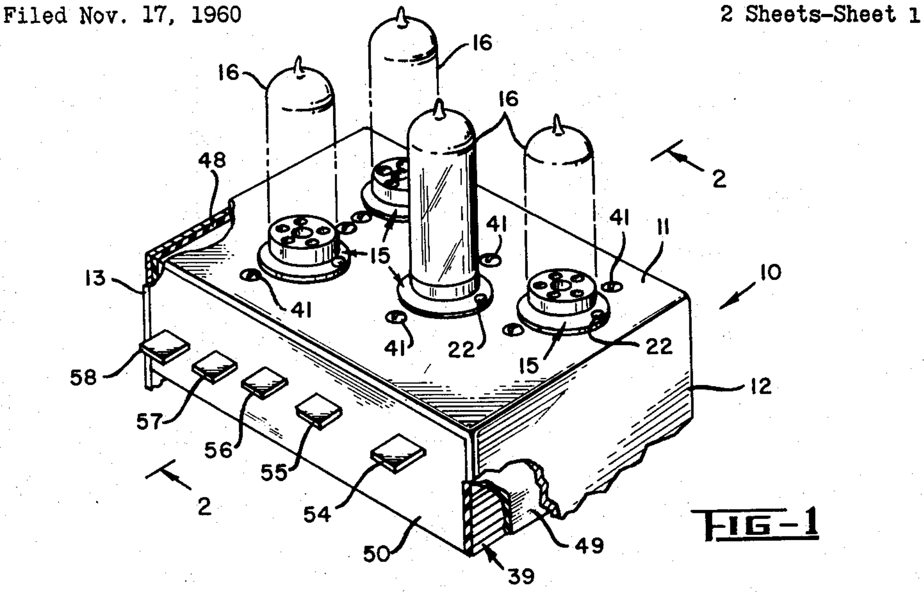
FIGURE 1 is a perspective view of a chassis constrution embodying my invention.

Referring now to the drawings, a preferred embodiment of my invention is illustrated as a chassis 10 having a top plate 11 and side walls 12 and 13. The chassis is designed to support electrical circuits and components including vacuum tubes, and the top plate 11 accordingly has a plurality of tube sockets 15 mounted thereon for receiving vacuum tubes 16, certain of which are shown in broken line for clarity of the drawings. While I prefer to illustrate my invention in conjunction with tube sockets as an example of chassis hardware having a cluster of connection terminals at one location, it will be readily apparent from the following description that the invention can also be practiced with advantage with multi-terminal potentiometers, transformers, multi-tap inductance coils, etc.

Figure 2:
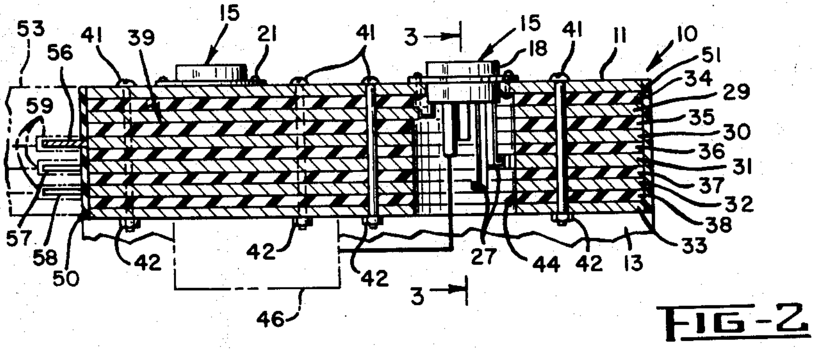
FIGURE 2 is a section taken on line 2—2 of FIGURE 1.
Figure 3:
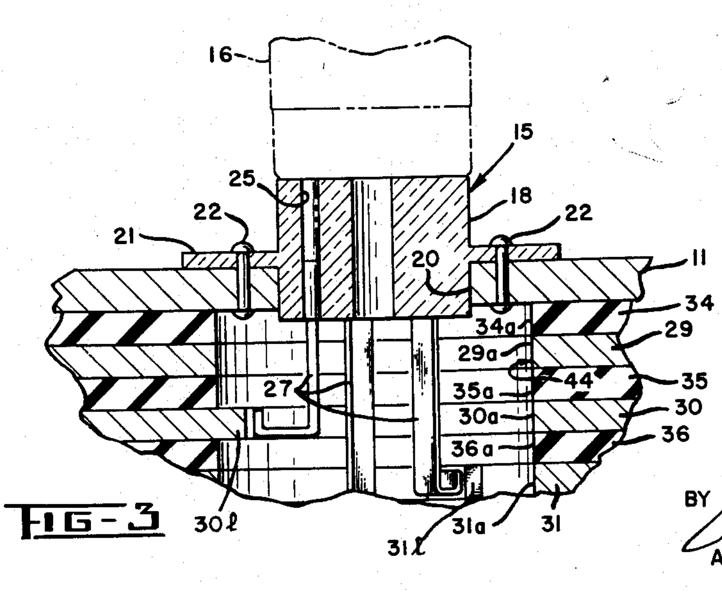
FIGURE 3 is a greatly enlarged portion of FIGURE 2 showing details of construction including the way of connecting socket terminals to conductors in the multi-layer transmission line.

Each tube socket 15 may be made of thermoplastic, such as "Bakelite," having a cylindrical body 18, see FIGURES 2 and 3, the lower portion of which extends snugly through opening 20 in the top plate 11. An integral flange 21 on the tube socket body axially locates the socket in hole 20 and provides means for securing the socket by rivets 22 to the top plate. Each socket has a plurality of tube prong receiving holes 25 into which the prongs, not shown, on the tubes are inserted from the top of the socket. The lower end of each prong hole 25 is fitted with a connector terminal 27 for making contact with the tube prong, the terminal extending below the socket for appropriate connection to associated circuitry.

The above description relates to a conventional chassis and tube socket construction and per se does not embody my invention.

In accordance with my invention, there is incorporated into the chassis construction a transmission line in the form of a plurality of sheet-like conductors 29, 30, 31, 32 and 33 spaced apart from the chassis top plate and from each other by insulating layers 34, 35, 36, 37 and 38, respectively, arranged alternately with the conductors in a stack 39. The thicknesses of the conducting and insulating layers have been greatly exaggerated in the drawings for the sake of clarity. In practice, the layers are relatively thin; for example, the conductor sheets 29–33, inclusive, may be made of copper foil having a thickness of approximately 0.02 inch and the insulator sheets may consist of a lossy (low power-factor) material, such as "Thiokol FA," each sheet of which has a thickness of approximately 0.03 inch.

The conductor and insulator layers of the stack 39 have substantially the same area dimensions and may have an overall length and width equal to the length and width of the chassis top plate, as shown in the drawings, or may have smaller dimensions if desired. Several insulated bolts 41 extend through chassis top plate 11 and through the stack 39 for engagement by nuts 42 to secure the stack firmly on the chassis. Alternately, the conductor and insulator sheets may be cemented together as a subassembly and this "sandwich" clamped to the chassis with the top plate 11 acting as an outer layer of the "sandwich."

Figures 4, 5:
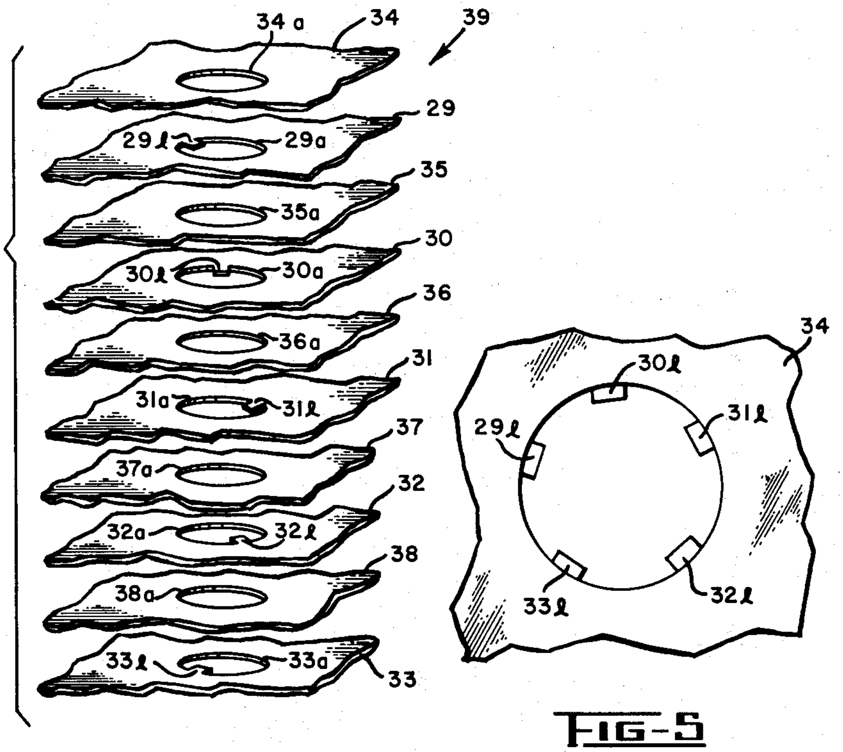
FIGURE 4 is an exploded fragmentary view of the stacked conducting and insulating layers of the transmission line.
FIGURE 5 is a plan view of the stack opening as viewed from the top of FIGURE 4.

Stack 39 has an opening 44 for each tube socket 15 and each stack opening is in axial alignment with a corresponding opening 20 in the chassis top plate; the stack opening 44 consisting of aligned openings 29a–33a and openings 34a–38a, see FIGURES 2 and 4, in the conducting sheets 29–33 and insulator sheets 34–38, respectively. The diameter of stack opening 44 preferably is greater than the diameter of the aligned top plate opening 20 in order to facilitate connection of the socket terminals 27 to the adjacent parts of the conducting sheets and to other components or circuits which are indicated generally by the broken line rectangle 46 in FIGURE 2. In short, socket terminals 27 are accessible from the underside of the chassis assembly through opening 44 in the stack for making the desired electrical connections.

In order to prevent shorting of the conductor sheets, the sides of the stack may be closed or sealed by insulating material 48, 49, 50 and 51, see FIGURES 1 and 2, which may be sheet stock or potting compound. Conductors 29–33, inclusive, are connected to external circuits 53, indicated by the broken line outline in FIG. 2, by means of prongs 54, 55, 56, 57 and 58, respectively, which connect to the respective sheets and which are supported in and project through insulator panel 52 for engagement in appropriate connector sockets 59 of the external circuit. It is apparent that other types of connectors may be used to electrically connect the stack conductors to adjacent circuits. The external circuit 53 may, for example, be a power supply for properly energizing tubes 16 with plate, screen and bias voltages, and one or more of the stack conductors may be connected externally to ground. If desired or necessary, resistors, high capacity condensers and other components may be added to circuit by connecting the same externally of the stack conductors.

The several socket terminals 27 on each tube socket 15 extend into the aligned stack opening 44 closely spaced to the marginal edges of the conducting sheets. In order to facilitate connection of the socket terminals to any of the conducting sheets 29–33, inclusive, the latter are formed with inwardly projecting terminal lugs 29*l*, 30*l*, 31*l*, 32*l* and 33*l*, respectively. These lugs on successive sheets in the stack are angularly displaced from each other as shown in FIGS. 4 and 5 in order to provide more room for making the socket terminal connection. The lugs, however, are sufficiently radially spaced from adjacent socket terminals so that any of the terminals may be electrically connected to other circuits, such as an interstage circuit designated by the broken line box 46 in FIG. 2, without contacting any of the terminal lugs.

Figure 6:
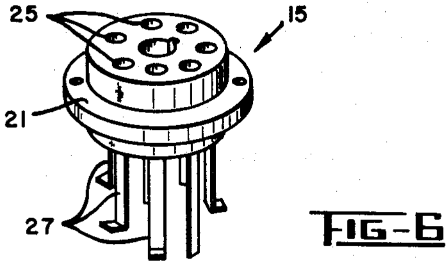
FIGURE 6 is a perspective view of a tube socket with its terminals bent for electrical connection to the multi-layer transmission line.

It will be apparent from the above description that the chassis construction embodying my invention is readily adaptable to production line assembly techniques wherein identical chassis assemblies are to be turned out in large numbers. Intermediate frequency amplifiers and similar multi-stage systems are particularly well adapted to this construction. For such applications, the conducting sheets comprising the multi-layer transmission line may be formed from sheet material by a stamping operation with several sheets of each conductor, such as conductor 29, being stamped at one time. The insulator sheets may also be similarly formed. The conductor and insulator sheets are then arranged in appropriate order preferably so that external connector prongs 54–58, inclusive, and terminal lugs 29*l*–33*l*, inclusive, are oriented as required to place each lug near the socket terminal to which it is to be connected, and the entire assembly then secured to the underside of the chassis. In this type of assembly operation, the lower ends of the socket terminals may be bent over as shown in FIG. 6 prior to assembly in order to make contact with the appropriate adjacent terminal lug on the conducting sheets.

An important feature of my invention is that the multi-layer stacked transmission line has inherent capacitance and inductance characteristics which normally are obtained through use of separate condensers and inductance coils. The magnitude of the capacitance in the stacked conductors depends upon the areas of the conducting and insulating sheets, the thicknesses of the insulating sheets, and the dielectric constant of the insulating material comprising the insulating sheets. By way of example, plate voltage for the tubes 16 on chassis 10 in FIGS. 1 and 2 may be supplied to prong 54 by a power source and distributed by conductor 34 to the plate voltage terminals of the several tube sockets. In order to isolate the power supply from the radio frequency energy in the plate circuits, prong 55 and its associated conductor sheet 30 may be connected to ground. Dielectric sheet 35 which separates sheets 29 and 30, provides a capacitative by-pass path for the plate circuits of all tubes mounted on the chassis, and the distributed nature of this capacitance renders it less sensitive to frequency changes, as explained below.

Figure 7:
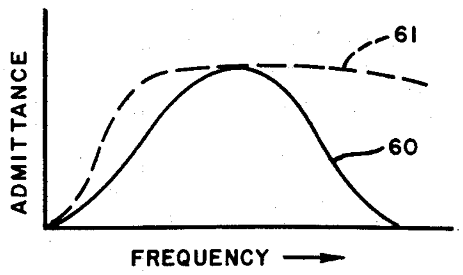
FIGURE 7 shows comparative admittance-frequency curves for a conventional by-pass condenser and for the multi-layer conductor of my invention.

The by-passing effect of this transmission line is maximized by minimizing characteristic impedance of the line. The characteristic impedance is proportional to inductance (which is affected by conductor area and spacing) and is inversely proportional to capacity, the latter being maximized by the use of relatively thin insulating sheets having a high dielectric constant. Thus by varying the parameters of area, thickness, spacing and dielectric constant of the layers of the stack, performance of the transmission line may be optimized. Also, by selecting lossy material for the insulating layers, variation of shunt impedance with changes in frequency can be minimized. The latter feature is illustrated in FIG. 7 in which the solid line curve 60 represents the variation in admittance of conventional mica or synthetic condensers with changes in frequency whereas the broken line curve 61 represents the broader response curve of my distributed type of condenser.

Changes, modifications and improvements to the above described embodiment of my invention may be made by those skilled in the art without departing from the spirit and scope of my invention. The scope of the invention is defined in the appended claims.

I claim:

1. A chassis construction comprising a rigid chassis member having a rectangular top plate and walls extending from the sides of and normal to the plate for a predetermined distance equal to the height of the chassis, said plate having a plurality of spaced socket openings having axes and having equal diameters, and transmission line means mounted under said top plate comprising a plurality of sheet-like conducting elements and a plurality of insulating elements, said conducting and said insulating elements having outer edges and being arranged in a stack with adjacent conducting elements spaced apart by and engaging opposite sides of an insulating element, a plurality of elongated insulated members extending through said top plate and through said stack of elements for securing the stack to the plate, insulator means covering the outer edges of said conducting elements, means for making external electrical connections to said conducting elements comprising a prong connected to an outer edge of each conducting element and projecting through said insulating means, said stack of elements having a plurality of openings having axes aligned with the axes, respectively, of said socket openings in said top plate, the diameter of each stack opening being greater than the socket opening aligned therewith, each conducting element having a terminal lug projecting into each of the stack openings, the several lugs within each stack opening being angularly and axially displaced from each other.

2. In combination, a chassis construction comprising a plate having a plurality of spaced socket openings having axes, and transmission line means mounted under said top plate comprising a plurality of sheet-like conducting elements and a plurality of insulating elements, said conducting and said insulating elements having outer edges and being arranged in a stack with adjacent conducting elements spaced apart by and engaging opposite sides of an insulating element, means for securing said stack to the plate, means for making external electrical connections to said conducting elements comprising a prong connected to an outer edge of each conducting element, said stack of elements having a plurality of openings having axes aligned with the axes, respectively, of said socket openings in said top plate, each conducting element having a terminal lug projecting into each of the stack openings, the several lugs within each stack opening being angularly and axially displaced from each other; a tube socket disposed in each socket opening of said plate and having a plurality of conductor terminals projecting into the aligned opening in the stack of elements, certain of said socket terminals engaging corresponding terminal lugs of the conducting elements.

References Cited in the file of this patent

UNITED STATES PATENTS

| | | |
|---|---|---|
| 294,574 | Blake | Nov. 15, 1881 |
| 2,006,436 | Bowers | July 2, 1935 |
| 2,097,370 | Hayashi | Oct. 26, 1937 |
| 2,492,236 | Mydlil | Dec. 27, 1949 |
| 2,514,562 | Stickney | July 11, 1950 |
| 2,914,254 | Lehman | Nov. 24, 1959 |
| 2,931,005 | Saurwein et al. | Mar. 29, 1960 |

FOREIGN PATENTS

| | | |
|---|---|---|
| 694,956 | Germany | Aug. 12, 1940 |